INVENTOR.
CHARLES E. KRAUS

3,159,042
ROLLER SUPPORT MECHANISM FOR TOROIDAL DRIVE

Charles E. Kraus, Franklin Lakes, N.J., assignor to Excelermatic, Inc., a corporation of New York
Filed Mar. 19, 1963, Ser. No. 266,363
10 Claims. (Cl. 74—200)

This invention relates to toroidal type variable speed-ratio transmissions and in particular to a novel and improved roller support mechanism for such transmissions.

Such transmissions comprise a pair of drive members having facing toroidal or toric surfaces with a plurality of rollers (preferably three) disposed and in friction driving contact with said surfaces and with each roller mounted for speed-ratio changing movement or precession of its axis of rotation to change the speed-ratio of the driving connection provided by the rollers between the toroidal members. A transmission of this type is disclosed in United States Patent 3,008,337, isuused on November 14, 1961.

As disclosed in United States Patent 3,048,047, issued on August 7, 1962, each roller is supported on a pivot shaft which has a limited movement along its axis for inducing speed-ratio changing movements of the rollers and also may rotate about its axis along with its associated roller as said roller varies its speed-ratio position. Said patent further discloses bearing support means for each pivot shaft positioned adjacent the ends of said pivot shafts which allows for translational and rotary movement of the pivot shafts while supporting said shafts against radial loads imposed on said shafts during transmission operation. The pivot shafts of said patent have a hydraulically actuated control mechanism at one end thereof for inducing translational movement of said shafts and positioned on an extension of the other end of said shafts is a damping mechanism for damping the translational movements of said shafts, the function of said mechanisms being clearly described therein.

As further disclosed in my co-pending application Serial No. 94,188, filed on March 8, 1961, now Patent No. 3,087,348, the toroidal surfaces are relatively axially movable for maintaining friction driving contact pressure with the rollers. As the toroidal surfaces are moved relatively toward each other, axial pressure is exerted by both toroidal surfaces on the rollers which in effect squeezes the rollers between the surfaces. This squeezing effect exerts a radial pressure on the rollers and forces the rollers radially outwardly. So it can be seen that radial loads will be imposed on the rollers and their support mechanism and if the radial loads are not adequately compensated for the roller supporting pivot shafts may deflect and the friction driving contact pressure between the rollers and the toroidal surfaces may be reduced thus affecting the operation of the transmission.

The present invention provides for a novel and improved bearing support mechanism for the pivot shafts which permits the use of shorter, stiffer shafts than could previously be used and results in a more compact and rugged structure than could heretofore be utilized. Further, the present invention substantially eliminates pivot shaft deflections and increases loading capacity on said shafts, in particular radial loads imposed through the roller mechanism and enables more uniform loading of the bearings.

The invention is generally carried out by providing a substantially semicylindrical cradle-type bearing mechanism which is positioned beneath and wraps around a substantial portion of each pivot shaft and is disposed directly opposite its associated roller. Bearing means at the ends of the pivot shafts are therefore not required and the related hydraulically actuated control mechanism and damping mechanism for each pivot shaft may be incorporated within the ends of the pivot shafts without any sacrifice in pivot shaft supporting structure. Therefore, the pivot shaft and its associated mechanisms can now be combined in a more compact structure which serves to reduce the overall size of the transmission.

Accordingly, it is one object of the present invention to provide a novel and improved roller support mechanism for a toroidal type transmission.

It is another object of the invention to provide a novel and improved roller support mechanism for a toroidal type transmission which is rugged in construction and more compact than said mechanisms in previous transmissions of this type.

It is a further object of the invention to provide a novel and improved roller support mechanism for a toroidal-type transmission which substantially eliminates roller pivot shaft deflections and having increased loading capacity at said roller pivot shafts.

It is an additional object of the invention to provide a novel and improved roller support mechanism for a toroidal-type transmission wherein shorter, stiffer roller pivot shafts may be used thereby increasing compactness and strength of said transmission.

It is also an object of the invention to provide a novel roller pivot shaft construction for a toroidal-type transmission wherein associated translational inducing and damping mechanisms may be incorporated within the roller pivot shaft thereby increasing overall compactness of said transmission.

It is still another object of the invention to provide novel and improved roller support mechanism which includes a novel damping mechanism incorporated within each roller pivot shaft.

Other objects and advantages will be apparent upon reading the annexed detailed description with the accompanying drawings in which.

Figure 1:
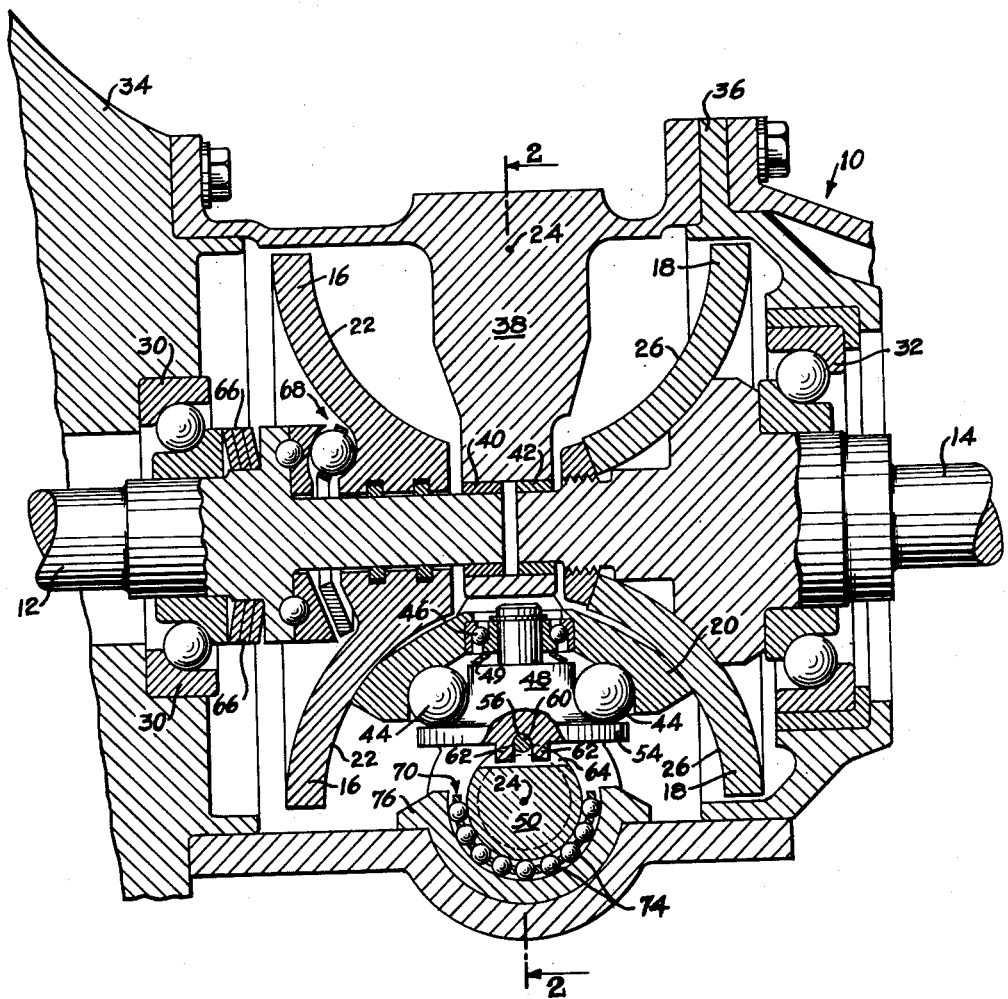
FIG. 1 is an axial sectional view through a toroidal-type transmission embodying the invention.
Figure 2:
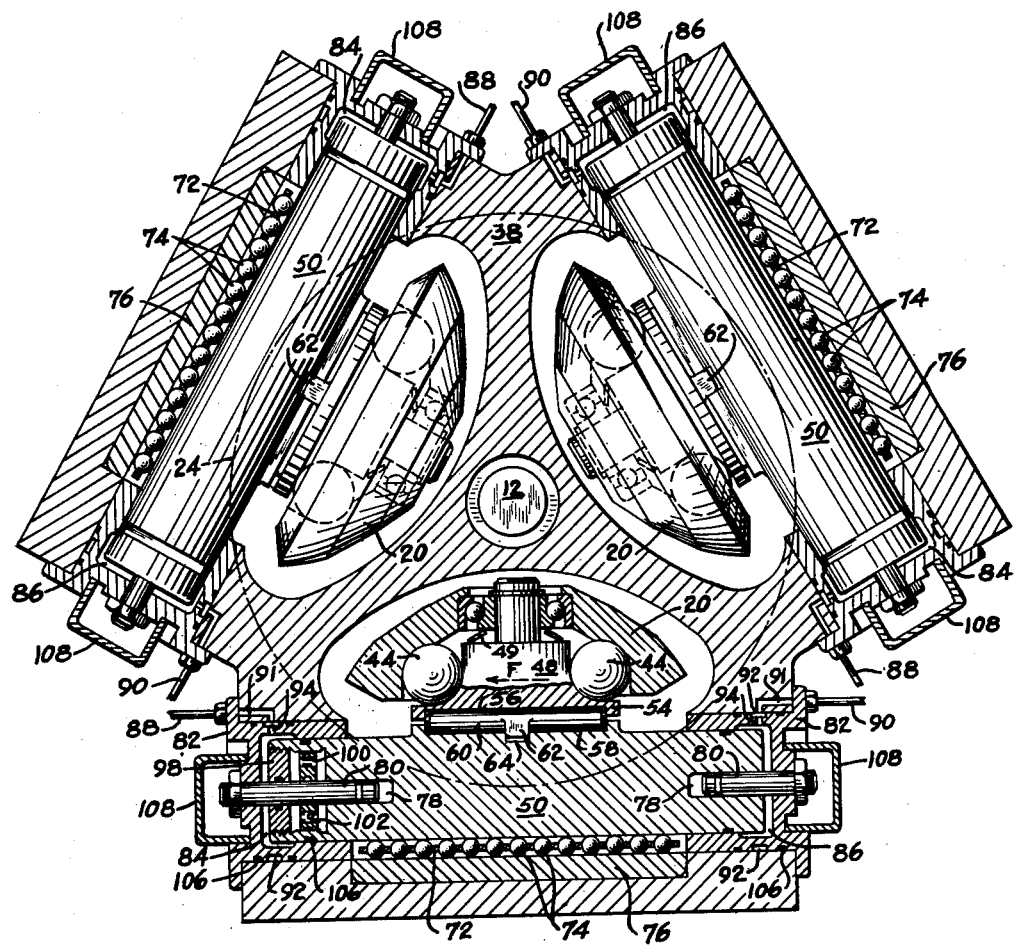
FIG. 2 is a sectional view taken along line 2—2 of FIG. 1.
Figure 3:
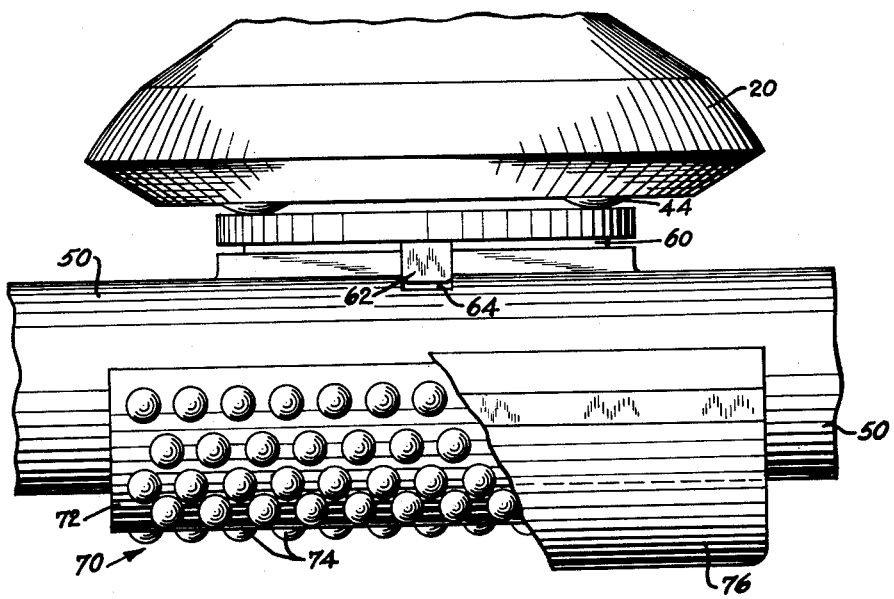
FIG. 3 is an enlarged view of a bearing mechanism of the invention with its associated roller mechanism.

Referring now to FIGS. 1 and 2 of the drawings, a transmission 10 is illustrated as comprising co-axial input and output shafts 12 and 14, input and output toroidal disc members 16 and 18 co-axially mounted on and drivably connected to the shafts 12 and 14 respectively, and a plurality of circumferentially-spaced rollers 20 disposed between and in friction driving engagement with the toric surfaces of the disc members 16 and 18. Preferably, as illustrated, three rollers 20 are provided between the toroidal members 16 and 18. Also, at least one of the toroidal members 16 and 18 is axially movable toward the other. For this purpose the disc member 16 is supported on the input shaft 12 for axial movement therealong.

The input toroidal disc member 16 has a toroidal surface 22 which preferably is generated by rotating a substantially circular arc about the common axis of the input and output shafts 12 and 14, the center of the generating arc tracing the circle 24 as the toric surface 22 is generated. The output toroidal disc member 18 has a similar toroidal surface 26 facing the input toroidal surface 22 and having substantially the same toric center circle 24.

The shafts 12 and 14 are supported by bearings 30 and 32 in a multi-part housing including end sections 34 and 36 and an intermediate section 38 secured to said end section. The intermediate housing section 38 is a Y- shaped frame structure between which the three rollers 20 are disposed, said Y-shaped structure providing end bearings 40 and 42 for the adjacent ends of the shafts 12 and 14.

Each roller 20 is journaled by bearings 44 and 46 on a spindle 48, said bearings being designed to support its roller against radial loads and to support its roller 20 against thrust radially outward along its spindle 48, the axis of each said spindle 48 being substantially radial relative to the transmission axis. A spring 49, preferably in the form of a Belleville washer, is disposed between the inner race of the bearing 46 and a shoulder on the spindle 48 so that the axial thrust on the roller 20 serves through its bearing 46 to compress the spring 49 thereby to distribute the axial thrust between the bearings 44 and 46. Since the Belleville spring 49 is between the bearing 46 and the spindle 48 it serves to limit the thrust load carried by said bearing 46, said bearing 46 having a substantially smaller load carrying capacity than the bearing 44.

Each roller spindle 48 is supported by a pivot shaft 50 for speed-ratio changing movement of its roller about the axis of its said pivot shaft and relative to the toric surfaces 22 and 26. Relative to the transmission axis, each roller 20 is disposed on the radially inner side of its associated pivot shaft 50. The axis of each pivot shaft 50 is substantially tangent to the toroidal center circle 24 and is disposed in a plane perpendicular to the transmission axis. Thus, the pivot shafts 50, like the rollers 20, are circumferentially-spaced about the transmission axis, there being one pivot shaft 50 for each roller.

Each roller spindle 48 has an end plate 54 having a substantially semi-cylindrical groove 56 facing a corresponding groove 58 in the surface of a central portion of its associated pivot shaft 50. Each such semi-cylindrical groove 56 and 58 is disposed parallel to the axis of its associated pivot shaft 50. A pin 60 is received in each facing pair of grooves 56 and 58 so that through its pin 60 the associated roller 20 is supported by the shaft 50 for speed-ratio changing movement of the roller with and about the axis of its shaft 50.

Each pin 60 also permits a limited pivotal movement of its associated roller 20 about the axis of said pin to equalize the contact pressures of said roller against the toric surfaces 22 and 26.

Each pivot shaft 50 has a limited movement along its axis and its associated roller spindle end plate 54 has tongue lugs 62 received within a cross-slot or groove 64 in the shaft 50 so that movement of a shaft 50 along its axis results in a corresponding movement of its roller 20 in this direction. Obviously, since the cross-slot 64 on each pivot shaft 50 is disposed at right angles to the adjacent pin 60, this engagement between each pivot shaft cross-slot 64 and the roller spindle lugs 62 does not interfere with limited pivotal movement of the associated roller spindle 54 about the axis of the pin 60 to equalize the contact pressures of the associated roller 20 against the toric surfaces 22 and 26.

The direction of rotation of the transmission is such that as viewed in FIG. 2 the input toric member 16 rotates clockwise and therefore the traction forces F exerted by the toric members 16 and 18 on, for example, the lower roller 20 are directed toward the left. Any unbalance of the traction forces on a roller and the forces along and on its pivot shaft 50 results in movement of the roller and its pivot shaft 50 along the axis of said shaft. As fully explained in the aforementioned Patent 3,048,047 such movement of a roller 20 along the axis of its pivot shaft 50 results in precession, or speed-ratio changing pivotal movement of the roller with and about the axis of its pivot shaft 50 to a speed ratio position in which said forces again are in balance.

As is known, speed-ratio changing precession of the rollers may also be produced by tilting of each roller about an axis through or parallel to a line through the points of contact of the roller with the toric members 16 and 18. As is also disclosed in said patent, if such a roller tilt axis is offset from a line through the roller points of contact with the toric members, then the traction forces exerted by the toric members 16 and 18 on each roller apply a turning moment on the roller about its tilt axis which may be balanced by the hydraulic control force. Accordingly it is within the scope of this invention to use such roller tilting to induce speed-ratio changing precession of the rollers instead of shifting of each roller along the axis of its pivot shaft 50.

A Belleville washer 66 along with a cam and sprag device 68 may also be provided as illustrated in FIG. 1 for axially loading the input disc 16 toward output disc 18 so that friction contact will be maintained between discs 16, 18 and rollers 20 during operation. Reference may be made to said aforementioned Patent 3,048,047 for a more complete description of the function of the washer 66 and cam and sprag device 68. It should of course be understood that other suitable mechanisms may be utilized for axially loading the discs and the details of the cam and sprag device and Belleville washer form no part of the present invention.

As the input disc 16 is urged toward output disc 18, the two discs exert axial pressure on the rollers 20. Since the rollers 20 are mounted inwardly of the toric center line, as illustrated, the contact pressure from the discs 16 and 18 on the rollers forces the rollers 20 radially outwardly so that the rollers 20 exert radial pressure on their associated pivot shafts 50 which is concentrated substantially at the center portion of the pivot shafts 50 due to the location of the rollers with respect to their pivot shafts. These radial loads tend to cause the pivot shafts to deflect at said center portions and in order to combat shaft deflection the pivot shafts in previous embodiments were built-up around the center portion. Also, in order to provide adequate bearing surface for said previous pivot shafts, they were made substantially long and were supported by bearings adjacent their axial end portions. These axial end portions of the pivot shafts were required to be strong at their bearing support areas in order to support the varying loads imposed upon the pivot shafts. Therefore, the related hydraulic control and damping mechanisms had to be mounted externally of the pivot shafts and the transmission housing which required a substantially bulky structure. The present invention presents a novel and improved pivot shaft construction over that of previous embodiments as will be pointed out hereinafter.

In accordance with the invention each roller pivot shaft 50 is cradled in a substantially semi-cylindrical bearing means which is disposed on the opposite side of the associated pivot shaft from the side supporting the rollers 20. As illustrated in the drawings, the bearing means includes a substantially-semi-cylindrical bearing member 70 comprised of a substantially-semi-cylindrical bearing cage or ball retainer 72 surrounding a portion of its associated pivot shaft 50 and carrying a plurality of movable balls 74 therein which cover substantially the entire surface area of the retainer 72. Of course, the invention is not intended to be limited to the number and size balls illustrated and in particular in FIGS. 1 and 2 some balls have been eliminated for reasons of clarification of illustration.

As further illustrated by the drawings, each bearing member 70 is disposed with respect to its pivot shaft such that, the bearing member 70 extends in a direction parallel to the pivot shaft axis and terminates a substantial distance from each end of its associated pivot shaft. Thus, the bearing member 70 may be said to be centrally disposed and radially outwardly of its associated pivot shaft 50.

A bearing support member 76 is positioned radially outwardly of the bearing member 70 with respect to the transmission axis and in turn is supported on a mating section of the intermediate housing 38, as illustrated in FIGS. 1 and 2. The bearing support member 76 is shaped so as to receive the entire bearing member 70 therein. As can be seen from the drawings, the support member 76 also serves as a stationary outer race for the bearing member 70 and the pivot shaft 50 serves as a movable inner race for said bearings member thereby allowing the pivot shaft to translate along its axis and pivot about its axis while the bearing member 70 has a limited movement with respect to pivot shaft 50 and its support member 76.

Since bearing support at the end portions of the pivot shafts is not required with the bearing support of the present invention, these end portions may be utilized for incorporating related hydraulic control mechanisms and damping mechanisms therein. As shown in FIG. 2, each end portion of the pivot shafts 50 has a hollow portion 78 formed therein in which is slidably received a pin 80. The pins 80 are suitably fastened to a sleeve member 82 which is received into the intermediate housing and surrounds the end portions of the pivot shafts thereby defining cavity portions 84 and 86 between the respective axial ends of each pivot shaft and its respective sleeve member 82. A fluid supply pressure is supplied to cavity portions 84 and 86 from a suitable fluid pressure control system, as for example that clearly described in co-pending application entitled "Ratio Control For Toroidal Traction Drive" invented by Michael Davis and Charles E. Kraus, and may enter the cavity portions 84 and 86 through conduits 88 and 90, respectively. The conduits 88 and 90 each feed a passageway 91 in the intermediate housing which terminates at an annulus 92 in each sleeve member 82 and which is interconnected with cavity 84 by a passageway 94. It will be apparent that each pivot shaft may be caused to translate along its axis by varying the fluid pressure to the cavities 84, 86 where the fluid pressure will act on the end face of the pivot shafts, which act as piston faces, and induce translational movement in accordance with the differential pressure in each of the cavities, as clearly explained in the above-mentioned co-pending application.

When the rollers are caused to rapidly pivot toward a higher speed-ratio or overdrive position, as by a sudden decrease in load, the contact pressure between the rollers and toroidal surfaces has a tendency to lag and therefore the rollers may slip with respect to said surfaces, if the pivotal movement of the rollers is not dampened. However, the amount of damping required for sudden movements of the rollers toward low speed-ratio or underdrive positions as for example due to sudden load increase, does not have to be as great since the contact pressure between the rollers and discs is normally greater in the lower speed-ratio range and slippage will be less likely to occur. Further, sudden load increases are best absorbed by the transmission at lower speed-ratios since the transmission is effectively slowed down and therefore sudden pivotal movements toward a lower speed-ratio position is not in itself undesirable as in the case of sudden pivotal movements toward higher speed-ratio positions.

The damping mechanism of the present invention provides for different rates of damping of the pivotal shafts 50 so that translational movements of said pivot shafts inducing roller movement towards higher speed-ratio positions are effectively dampened a greater amount than translational movements inducing roller movement toward lower speed-ratio positions.

Figure 4:
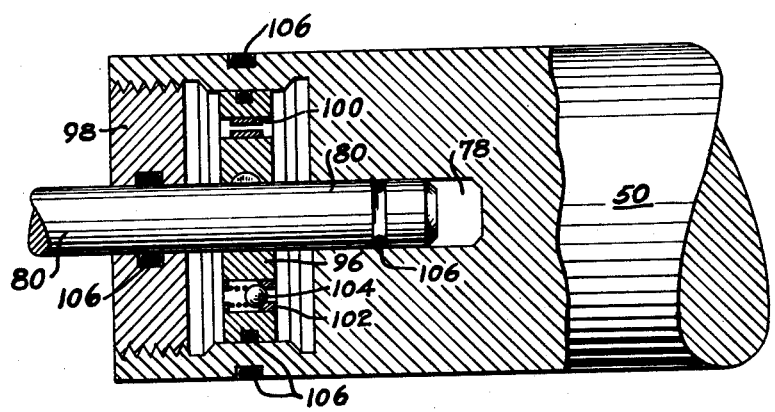
FIG. 4 is an enlarged sectional view of a portion of a pivot shaft of the invention illustrating the damping mechanism therein.

Each of the pivot shafts 50 is further provided with an enlarged hollow portion in one of its end portions for receiving a damping mechanism therein. As illustrated in FIGS. 2 and 4, the damping mechanism may comprise a damping piston 96 which is suitably keyed to the pin 80 and spaced from the end face of the enlarged hollow portion in pivot shaft 50 so that the pivot shaft 50 may slide with respect to said piston 96 and pin 80. A removably mounted insert member 98 is spaced along the axis of pin 80 from the piston 96 and is supported in the end of the pivot shaft 50 so that it will slide with pivot shaft 50 with respect to pin 80. The insert member 98 forms the major portion of the piston face at its respective end of the pivot shaft.

As further shown in FIG. 4, the enlarged hollow portion in pivot shaft 50 containing the damping piston 96 is filled with a damping fluid which may be of the type disclosed in the aforementioned Patent 3,048,047. A restricted damping passage 100 is provided in one portion of the piston 96 for permitting restricted flow of the damping fluid between the faces of the damping piston 96 so that any sudden translational movements of the pivot shaft which may induce the rollers to pivot to a new underdrive or overdrive position will be dampened by the restricted flow of the damping fluid through the restricted damping passage 100.

A second damping passage 102, which is larger in cross-sectional area than passage 100, is also provided in a second portion of the piston 96, the passage 102 being provided with a check valve 104. The check valve 104 is oriented in passage 102 such that when the pivot shaft 50 translates toward a lower speed-ratio position, that being to the left as viewed in FIG. 4, the check valve 104 will be pushed open by the fluid on the right side of piston 96, as viewed in said FIG. 4. It will be apparent therefore, that the fluid will flow through both passages 100 and 102 when the pivot shaft 50 translates toward underdrive. When the pivot shaft translates toward overdrive or high speed-ratio position, the fluid on the left side of piston 96 will push the check valve 104 closed and fluid will only flow through restricted passage 100 in this case. Therefore, it can be seen that the amount of damping is substantially greater when the pivot shaft translates toward overdrive than when translating toward underdrive.

Suitable seals 106 may be provided on the pivot shaft 50, the sleeve member 82, the piston 96, the pin 80 and the insert member 98, as illustrated, for preventing any fluid leakage or by-pass in the region of these elements. Cap members 108 may also be provided on the outer ends of the sleeve members 92 for enclosing the fastened ends of the pins 80.

It will be apparent from the above detailed description that the radial loads imposed upon the pivot shafts will be absorbed by the novel bearing means of the invention and due to the positioning and large bearing area provided by said bearing means it is no longer necessary to build up the pivot shafts at their center portions wherein the radial loads are normally concentrated. Further, since separate bearing support means are no longer required at the axial ends of the pivot shafts, a novel pivot shaft construction may be utilized wherein a novel damping mechanism is located within end portions of the pivot shafts. The novel construction of the invention results in a more compact pivot shaft construction with increased load capacity and an overall more compact and rugged transmission structure.

While I have described my invention in detail in its preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A variable speed-ratio transmission having co-axial input and output members with facing toric surfaces having a substantially common toric center circle; a plurality of circumferentially-spaced rollers disposed between and having contact pressure engagement with said surfaces for transmitting torque from the input member to the output member; a plurality of circumferentially-spaced pivot shafts each disposed substantially tangent to said toric center circle, there being one pivot shaft for each roller with each roller being disposed radially inwardly of its pivot shaft relative to the transmission axis and operatively connected thereto for support thereby so that pressure of said toric surfaces against the rollers is effective to urge each roller radially outwardly toward its pivot shaft; each roller pivot shaft being rotatable about its axis to provide for speed-ratio changing movement of its roller across said toric surfaces; and a substantially semi-cylindrical bearing for supporting each pivot shaft and disposed on the outward side of the pivot shaft directly opposite the associated roller.

2. A variable speed-ratio transmission as recited in claim 1 and in which each said semi-cylindrical bearing includes a plurality of ball elements and a semi-cylindrical bearing cage within which said ball elements are received.

3. A variable speed-ratio transmission as recited in claim 1 including a pair of fixed means for each pivot shaft and disposed at opposite ends thereof with each said fixed means having a cylindrical recess for receiving the adjacent end of its pivot shaft; and means for supplying a fluid under pressure to the recesses at the ends of each pivot shaft for applying an axial control force to each pivot shaft to determine the speed-ratio position of the rollers.

4. A variable speed-ratio transmission as recited in claim 1 in which each said pivot shaft is translationally movable parallel to the axis of said shaft for inducing speed-ratio changing movement of its roller, and its semi-cylindrical bearing is disposed intermediate the ends of said shaft.

5. A variable speed-ratio transmission as recited in claim 4 in which one end of each pivot shaft includes means for damping translational movements of said shaft along its axis, each said damping means including a hollow cylindrical space in one end of its pivot shaft and a fixed piston member disposed within said space with at least one restricted passage therethrough dividing said space into a pair of opposed compartments interconnected by said restricted passage, and fluid substantially filling said compartments.

6. A variable speed-ratio transmission as recited in claim 5 in which said piston member has a pair of restricted passages therethrough with one restricted passage having a larger cross-sectional area than the other, the larger of said restricted passages of each piston member including a check valve for decreasing the amount of damping by said damping means for movement of its associated pivot shaft in a direction for inducing speed-ratio changing movement of its roller in a direction for decreasing the speed of the output member.

7. A variable speed-ratio transmission having co-axial input and output members with facing toric surfaces; a plurality of circumferentially-spaced rollers disposed between and in driving contact with said surfaces for transmitting torque from the input member to the output member; support means for each roller including a pivot shaft providing for speed-ratio changing pivotal movement of said roller across said toric surfaces; bearing support means for said pivot shaft; said pivot shaft being supported for translational movement along its axis for initiating speed-ratio pivotal movement of said roller such that for one direction of translational movement of said pivot shaft, speed-ratio pivotal movement of said roller toward a position of high output speed relative to input speed is initiated and for a second direction of translational movement of said pivot shaft, speed-ratio pivotal movement of said roller toward a position of low output speed relative to input speed is initiated; means for inducing translational movement of said pivot shaft; and damping means for said pivot shaft for damping the translational movements of said pivot shaft; said damping means including means for decreasing the amount of damping by said damping means for translational movement of said pivot shaft in said second direction.

8. A variable speed-ratio transmission as recited in claim 7 in which said damping means includes a fixed piston member positioned in a hollow cylindrical space within one end of said pivot shaft; said pivot shaft being movable relative to said piston member; restricted passage means in said piston member dividing said space into a pair of opposed compartments interconnected by said restricted passage means; and said compartments being substantially filled with fluid.

9. A variable speed-ratio transmission as recited in claim 8 in which said restricted passage means includes a pair of restricted passages therethrough; one of said restricted passages having valve means positioned therein; and said valve means being operative for decreasing the amount of damping by said damping means for translational movement of said pivot shaft in said second direction.

10. A variable speed-ratio transmission as recited in claim 7 in which said bearing support means for said pivot shaft comprises a substantially semi-cylindrical bearing member disposed on the opposite side of said pivot shaft from its associated roller.

References Cited in the file of this patent

UNITED STATES PATENTS

| 2,856,784 | Weisel | Oct. 21, 1958 |
| 2,907,220 | Weisel | Oct. 6, 1959 |